US005442471A

United States Patent [19]

Takemori et al.

[11] Patent Number: 5,442,471

[45] Date of Patent: Aug. 15, 1995

[54] OPTICAL DIGITAL APPARATUS

[75] Inventors: Tamiki Takemori; Makoto Hosoda, both of Hamamatsu, Japan

[73] Assignee: Hamamatsu Photonics K.K., Hamamatsu, Japan

[21] Appl. No.: 121,901

[22] Filed: Sep. 16, 1993

[30] Foreign Application Priority Data

Sep. 18, 1992 [JP] Japan ........ 4-249423
Nov. 2, 1992 [JP] Japan ........ 4-294472

[51] Int. Cl.$^6$ ........ G02F 1/015; G02F 3/00; G02F 3/02

[52] U.S. Cl. ........ 359/107; 359/108; 359/248; 359/259

[58] Field of Search ........ 359/107, 108, 246, 248, 359/256, 259, 260, 59

[56] References Cited

U.S. PATENT DOCUMENTS

| | | | |
|---|---|---|---|
| 4,567,569 | 1/1986 | Caulfield et al. | 359/107 |
| 4,790,635 | 12/1988 | Apsley | 359/260 |
| 4,892,370 | 1/1990 | Lee | 359/107 |
| 5,080,464 | 1/1992 | Toyoda | 359/107 |
| 5,251,052 | 10/1993 | Reyes et al. | 359/107 |
| 5,317,445 | 5/1994 | DeJule et al. | 359/107 |

OTHER PUBLICATIONS

Jun Tanida et al., "OPALS: Opticals Parallel Array Logic System", May 15, 1986, vol. 25, No. 10, Applied Optics, pp. 1565–1570.

McAulay, "Optical Computer Architectures", 1991, Wiley & Sons, New York, paragraph 8.3.1.

Brenner, "Digital Optical Computing", Applied Physics B. Photophysics and Chemistry, vol. B46, No. 2, Jun. 1988, Heidelberg DE, pp. 111–120.

Hashimoto et al., "Sequential Logic Operations Using Optical Parallel Processor Based Upon Polarization Encoding", Optical Computing & Processing, vol. 1, No. 4, Dec. 1991, London, pp. 303–313.

Ahmed et al., "Polarization–Encoding Optical Casting: Arithmetic Logic Unit (ALU) Design Using Truth–Table Partitioning", Optics Communications, vol. 90, No. 1–3, 1 Jun. 1992, Amsterdam, pp. 156–164.

Schneider et al., "Electro–Optical Multistability in GaAs/AlAs Superlattices at Room Temperature", Applied Physics Letters, vol. 56, No. 7, 12 Feb. 1990, pp. 605–607.

Guest et al., "Exclusive OR Processing (Binary Image Subtraction) Using Thick Fourier Holograms", Applied Optics, vol. 23, No. 19, Oct. 1, 1984, pp. 3444–3454.

*Primary Examiner*—Martin Lerner
*Attorney, Agent, or Firm*—Cushman, Darby & Cushman

[57] ABSTRACT

Operation results for all combinations of input optical signal values to be operated are previously determined and substantially parallel light beams reflecting the operation results for all combinations are generated. Selectors for selecting transmission area of the input light beams in accordance with digital information born by optical signals are arranged for the respective optical signals along the direction of propagation of the light beams. Through the logically cascade-connected selectors, an optical signal corresponding to a combination of current input optical signals is selected from the operation results for all combinations.

42 Claims, 11 Drawing Sheets

2-Input NAND

Truth Table

| B | A | Z |
|---|---|---|
| 0 | 0 | 1 |
| 0 | 1 | 1 |
| 1 | 0 | 1 |
| 1 | 1 | 0 |

Input (B, A) Output (Z)

1-bit Full Adder

Truth Table

| B | A | $C_{IN}$ | SUM | $C_{OUT}$ |
|---|---|---|---|---|
| 0 | 0 | 0 | 0 | 0 |
| 0 | 1 | 0 | 1 | 0 |
| 1 | 0 | 0 | 1 | 0 |
| 1 | 1 | 0 | 0 | 1 |
| 0 | 0 | 1 | 1 | 0 |
| 0 | 1 | 1 | 0 | 1 |
| 1 | 0 | 1 | 0 | 1 |
| 1 | 1 | 1 | 1 | 1 |

Input (B, A, $C_{IN}$) — Output (SUM, $C_{OUT}$)

OPTICAL DIGITAL APPARATUS

BACKGROUND OF THE INVENTION

1. Field of the Invention

The present invention relates to optical digital equipment for digitally processing an optical signal bearing digital information.

2. Related Background Art

In digital electronic technology represented by an electronic computer, a digital optical technique in which light is used to replace electrons as an electronic transmission medium to attain a high speed operation has been attracting much attention. In the field of the digital optical technique, a current target is directed at a digital optical computer and various systems and apparatus have been proposed and tested for an optical digital processor which is a base of the configuration.

A first example of such a processor is an optical digital apparatus using a space coded operation method represented by OPALS (Optical Parallel Array Logic System): J. Tanida et al, Applied Optics 25 (20), May 1986, pages 1565–1570). In this operation method, "0" and "1" information coded in a first direction of a space to a first optical signal to be operated and "0" and "1" information coded in a second direction normal to the first direction of the space to a second optical signal to be operated are superimposed to form a planar mask pattern. Then, lights are emitted from a plurality of light sources arranged in a space in a third direction normal to the first and second directions and an operation result is reflected to a specified area of an combined image of the lights through the mask pattern.

A second example is an optical digital apparatus which uses a holographic look-up table method (C. C. Guest et al., Applied Optics 23 (19), October 1984, pages 3444–3454). In this method, results corresponding to all combinations of input signal values for a predetermined operation to predetermined input signals are recorded in a hologram. In executing the operation, a coherent light corresponding to the input signal value is irradiated to the hologram and an operation result for the input signal value in the execution of the operation is derived from the reproduced image. In this method, any operation may be executed without regard to the complexity and the number of inputs and the operation time is substantially constant without regard to the time required to prepare the hologram. In addition, the operation time can be sufficiently short.

A third example is an optical gate logic device which uses a non-linear device having a non-linear optical effect. In this device, a sum of a plurality of lights is applied to a non-linear device and an interactive light emitted from the non-linear device by the non-linear optical effect is used as an operation result. In principle, a plurality of such devices may be combined.

SUMMARY OF THE INVENTION

It is an object of the present invention to provide an optical digital apparatus which uses light as an information medium, can attain a high speed operation and is simple in construction.

It is another object of the present invention to provide an optical digital apparatus which executes a digital operation such as a select operation, a logical operation, and an arithmetic operation used in a digital circuit, which uses light as an input/output medium.

A select operation apparatus of the present invention comprises (a) light emission means for outputting aggregation of spatially distributed optical digital information signals propagating in a predetermined direction and bearing binary digital information, and (b) a selector or a group of selectors for receiving a light control signal bearing binary digital information and selecting one of a portion of an aggregation of the digital information signals received in a predetermined area and a portion of an aggregation of the digital information signals received in an area other than the predetermined area in accordance with a value of the digital information born by the optical control signal.

The selector includes a unit selector for outputting a third optical information signal bearing the binary digital information born by one of a first optical information signal received in a first area and a second optical information signal received in a second area in accordance with a value of the binary digital information born by the optical control information, or a combined selector having such unit selectors combined.

The unit selector is preferably selected from the following two types in order to assure the high response speed.

A first type of selector comprises (1) a first variable transmission (or reflection factor) device and a second variable transmission (or reflection factor) device which are able to be driven independently and control one of the transmission (or reflection) of an input light and non-transmission (or non-reflection) of the light in accordance with an electric drive manner, and (2) a first electric charge injecting active device (transistor) and a second electric charge discharging active device (transistor) connected to the first variable transmission (or reflection factor) device, (3) a second electric charge injecting active device and a second electric charge discharging active device connected to the second variable transmission (or reflection factor) device, and (4) an optical detection circuit for issuing an activation direction to one of a first pair of the first electric charge injecting device and the second electric charge discharging device and a second pair of the second electric charge injecting device and the first electric charge discharging device and issuing a deactivation direction to the other pair in accordance with a value of the binary digital information born by the input optical control signal. The variable transmission (or reflection factor)device may be a self-electro-optic effect device (SEED) and preferably it has either a quantum confined Stark effect or a Wannier-Stark localization effect.

A second type of unit selector comprises (1) a first polarization plane rotation device for selectively conducting non-rotation or 90 degrees rotation of a polarization direction of an input linearly polarized light having a predetermined direction of polarization, (2) double refraction plate for changing an optical path in accordance with the direction of polarization of the input linearly polarized light received through the first polarization plane rotation device, (3) a second polarization plane rotation device for selectively conducting the non-rotation or the 90 degrees rotation of the direction of polarization of the linearly polarized light outputted from the double refraction plate, (4) a polarization plane rotation controller for setting the first polarization plane rotation device and the second polarization plane rotation device into a non-rotation mode or a 90 degrees rotation mode in accordance with a value of the binary digital information born by the optical control signal, and (5) an output light selector for selecting only the light outputted from a predetermined area of the second polarization plane rotation device. The polarization plane rotation device is preferably a twisted nematic liquid crystal cell.

In accordance with the first type of the unit selector, two variable transmission devices or variable reflection factor devices having the quantum confined Stark effect or the Wannier-Stark localization effect are combined and driving transistors are prepared for the injection/-discharge of the electric charges of the devices controlling the transmission/non-transmission of the light in the respective devices such that one is in the electric charge injection mode while the other is in the electric charge discharge mode in accordance with the value of information of the input optical signal bearing the selection direction information. Accordingly, only one is exclusively controlled to the transmission state to produce the output light.

Accordingly, in accordance with the unit selector of the first type, the optical digital apparatus which can switch the control at a high speed and facilitates the cascade connection is provided.

In accordance with the second type of unit selector, the non-rotation and the 90 degrees rotation of the direction of polarization to the input light polarized in the specific direction in the first polarization plane rotation device are controlled in accordance with the value of the information of the input signal light bearing the selection direction signal to switch the ordinary/extraordinary light of the input light in the double refraction device to change the optical path so that the light received in the second specified area is outputted from a light selection slit for the ordinary light and the light received in the second specified area is outputted from the light selection slit for the extraordinary light. The direction of polarization of the output light is assured to be same as the direction of polarization of the input light by the second polarization plane rotation device.

Accordingly, in accordance with the second type of the unit selector, an optical digital apparatus which can select the output light at a high speed and facilitates the cascade connection is provided.

A logical operation apparatus and an arithmetic operation apparatus of the present invention execute the logical operation and the arithmetic operation by inputting an aggregation of information signals bearing the information of the operation result to the select operation apparatus of the present invention.

In the logical operation apparatus and the arithmetic operation apparatus of the present invention, the light emission means of the select operation apparatus is operation result generation means for generating an aggregation of light signals of all combinations of a first number of binary digital values having substantially parallel direction of propagation to each other which reflect a predetermined operation result to all combinations of the first number of binary digital data values, and it outputs an aggregation of a second number of optical signals. The number of selectors installed corresponds to the number of optical control signals to be processed.

The operation result generation means may be constructed as follows:

A first type of operation result generation means comprises (1) a light emitting device, (2) first optical means for spatially spreading the light outputted from the light emitting device, (3) second optical means collimating the light outputted from the first optical means, and (4) a selection mask plate for receiving the collimated beam outputted from the second optical means to select one of the light transmission and the non-transmission in accordance with the value of the operation result in the area corresponding to the operation result of the operation results of all combination of the first number of binary digital information.

The light emitting device may be a laser oscillator or a photo-diode. The first and second optical means may be a convex lens and a concave mirror.

A second type of operation result generation means comprises independently actuatable light emitters of the number equal to the number of all combinations of the first number of binary digital information for outputting parallel beams to each other. The light emitter may be a laser oscillator or a photo-diode.

Examples of the logical operation to be executed by the logical operation unit of the present invention are a 2-input AND, a 2-input NAND, a 2-input OR, a 2-input EXOR and 2-input EXNOR where the first number is 2 and the second number is 1. An example of the arithmetic operation to be executed by the arithmetic operation apparatus of the present invention is a 1-bit full addition where the first number is 3 and the second number is 2. Almost all logical operations and arithmetic operations can be executed by modifying the configuration of the operation result generation means and the number of installed selectors.

In accordance with the optical digital apparatus for executing the logical or arithmetic operation, the operation results for all combinations of the input optical signals to be operated are previously determined, and the aggregation of the substantially parallel optical signals reflecting the operation results for all combinations is generated. Under this condition, the optical signal for the combination of the current input optical signals is selected from the light beams of the operation results for all the combinations by the set of logically cascade-connected selectors arranged one for each of the input optical signals for selecting the transmitted parts of the input light beams in accordance with the digital signals born by the input optical signals.

Accordingly, in accordance with the optical digital apparatus for executing the optical operation of the present invention, an optical digital apparatus which can operate at a high speed with a simple construction is provided. Since the apparatus may be configured without paying attention to the arrangement and the combination of the functional devices of different types, the number of steps of design can be reduced.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art form this detailed description.

DETAILED DESCRIPTION OF THE PREFERRED EMBODIMENTS

Figure 1:
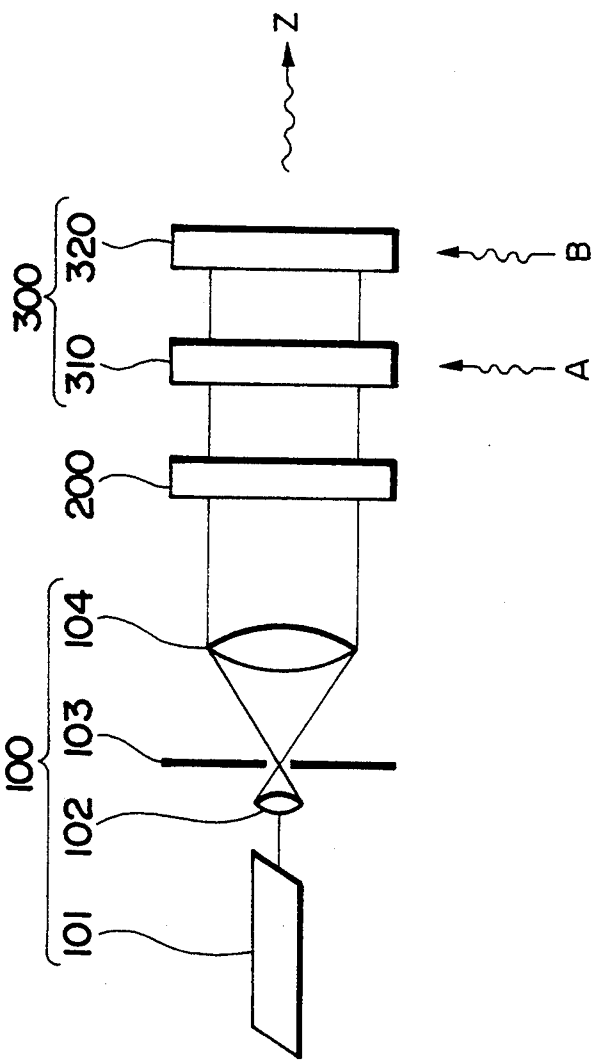
FIG. 1 shows a configuration of an optical digital apparatus in a first embodiment of the present invention.

The embodiments of the present invention will now be explained with reference to the accompanying drawings. In the drawings, like elements are designated by like numerals and the explanation of duplicate elements is omitted.

<First Embodiment>

FIG. 1 shows a configuration of an optical digital apparatus for executing a 2-input NAND operation in accordance with a first embodiment. Two input lights to be operated are referred to as an input light A and an input light B. The absence of the input light is referred to as "0" input, while the presence of input light is referred to as "1" input. Likewise, the absence of output light is referred to as "0" output, while the presence of output light is referred to as "1" output.

Figures 2, 3:
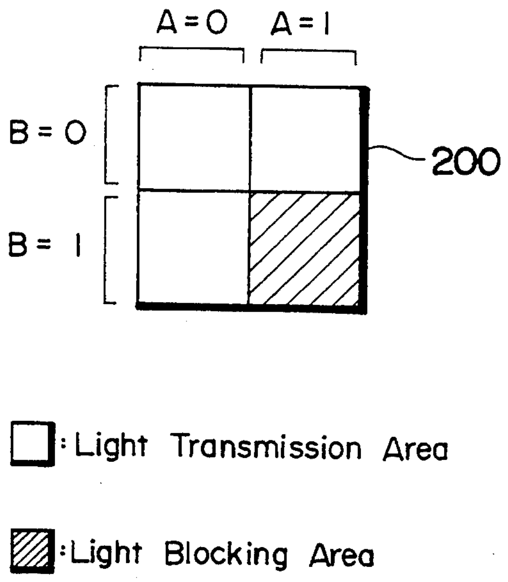
FIGS. 2 and 3 illustrate an operation result generation mask of the optical digital apparatus of the first embodiment.
Figure 4:
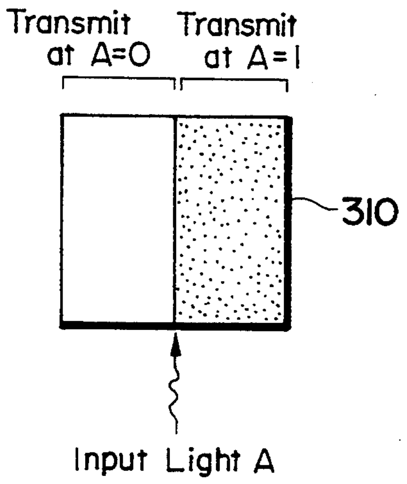
FIGS. 4 and 5 show a selector of the optical digital apparatus of the first embodiment.
Figure 5:
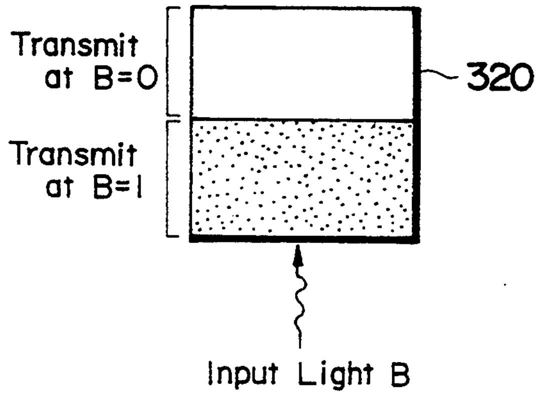
Figure 6:
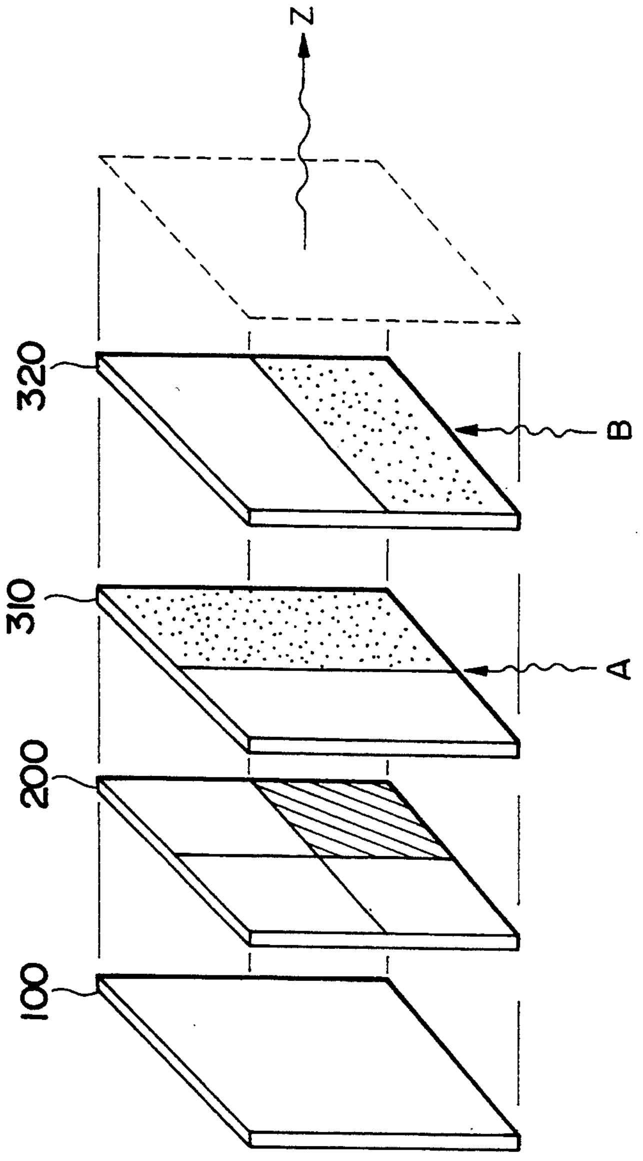
FIG. 6 shows major parts of the optical digital apparatus of the first embodiment.

The present apparatus comprises a plane light source 100 for emitting a collimated beam, an operation result generation mask 200 (see FIGS. 2 and 3) for receiving the collimated beam emitted from the plane light source 100 and outputting an aggregation of optical signals reflecting four ($=2^2$) 2-input NAND operation results equal to the number of all combinations of the input light A and the input light B, and a set of selectors 300 for receiving the input light A and the input light B of the four operation results in the aggregation of the optical signals and selecting one of the four operation results in the aggregation of the optical signals in accordance with the combination of the input values. The plane light source 100 comprises a laser oscillator 101, a convex lens 102 for spatially spreading the light emitted from the laser oscillator 101, a slit 103 for limiting an optical path of the light outputted from the convex lens 102, and a convex lens 104 for collimating the light outputted from the slit 103. The set of selectors 300 comprises a selector 310 (see FIG. 4) for receiving the input light A and transmitting only two of the operation result lights received through the operation result generation slit 200 in accordance with the value of the input light A (that is, the presence or absence of the input light A ), and a selector 320 (see FIG. 5) for receiving the input light B and transmitting only one of the two operation result lights received through the selector 310 in accordance with the value of the input light B (that is, the presence or absence of the input light B). FIG. 6 shows an arrangement relation of the operation result generation slit 200, the selector 310 and the selector 320.

In the present apparatus, the aggregation of the optical signals reflecting the four operation results of the 2-input NAND operation is previously generated by the plane light source 100 and the operation result generation slit 200 and is irradiated to the set of selectors 300. Under this condition, the input light A is applied to the selector 310 andhe input light B is applied to the selector 320. The light transmission areas of the selectors are determined in accordance with the values of the input lights so that the output light Z is produced as the NAND operation result of the input light A and the input light B.

In the present apparatus, the aggregation of the optical signals reflecting the operation results is generated by using the plane light source 100 and the operation result generation slit 200. Alternatively, the aggregation of the optical signals reflecting the operation results may be generated by using an LED array or a laser diode array having two-dimensionally arranged LED's or laser diodes which are independently activated.

Figure 7:
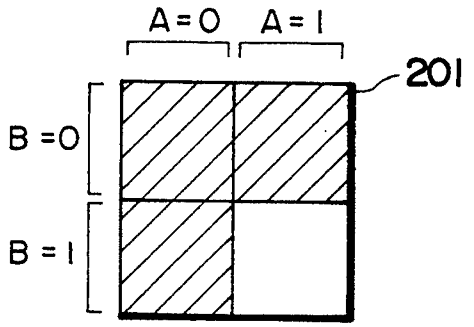
FIGS. 7 to 10 show an operation result generation mask for a 2-input 1-output operation.
Figure 8:
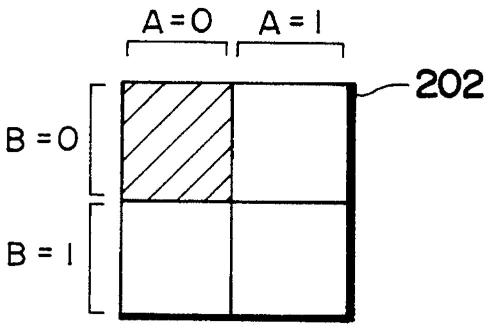
Figure 9:
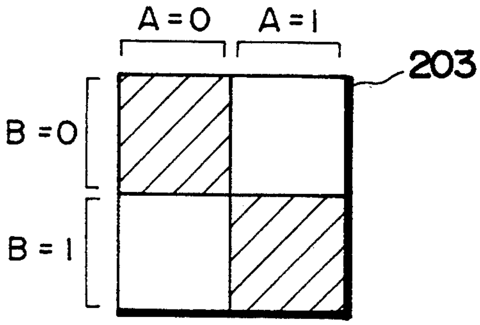
Figure 10:
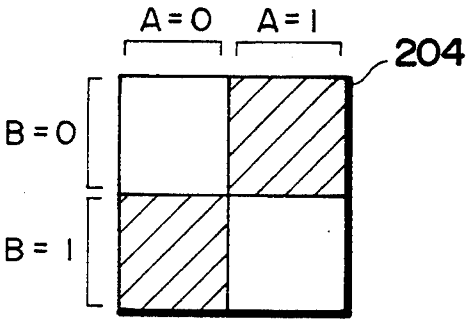
Figure 10:

Operation results of the 2-input 1-output type other than the NAND operation may be attained by simply modifying the pattern of the operation result generation mask. For example, a 2-input AND operation result is attained by using an operation result generation mask 201 shown in FIG. 7, a 2-input OR operation result is attained by using an operation result generation mask 202 shown in FIG. 8, a 2-input XOR operation result is attained by using an operation result generation mask 203 shown in FIG. 9, and a 2-input XNOR operation result is attained by using an operation result generation mask 204 shown in FIG. 10.

<Second Embodiment>

Figure 11:
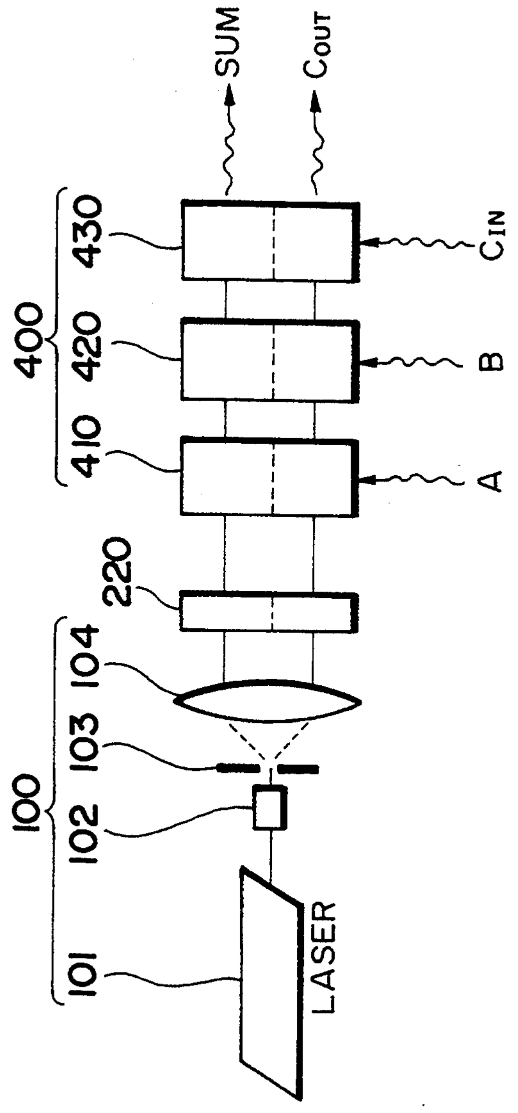
FIG. 11 shows a configuration of an optical digital apparatus in a second embodiment of the present invention.

FIG. 11 shows a configuration of an optical digital apparatus for executing a 1-bit full addition (3-input 2-output) in accordance with a second embodiment of the present invention. Three input lights to be operated are referred to as an input light A, an input light B and an input light $C_{IN}$, and two output lights are referred to as an output light SUM and an output light $C_{OUT}$. The absence of input light is referred to as "0" input, the input and presence of light is referred to as "1" input. Similarly, the absence of output light is referred to as "0" output, and the presence of output light is referred to as "1" output.

Figures 12, 13:
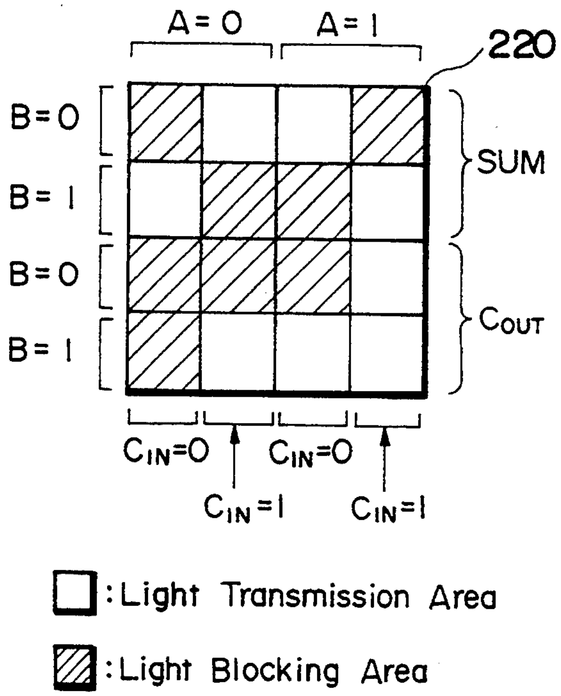
FIGS. 12 and 13 show an operation result generation mask of the optical digital apparatus of the second embodiment.
Figure 14:
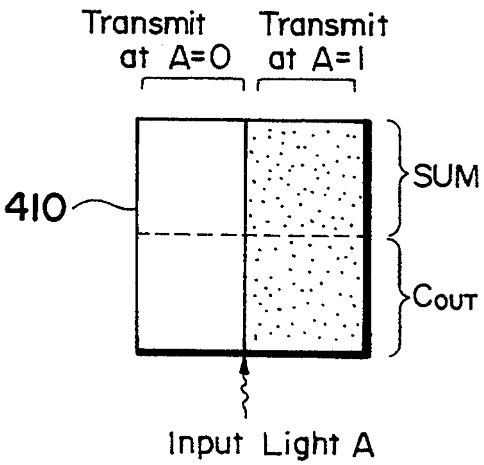
FIGS. 14 to 16 show a selector of the optical digital apparatus of the second embodiment.
Figure 15:
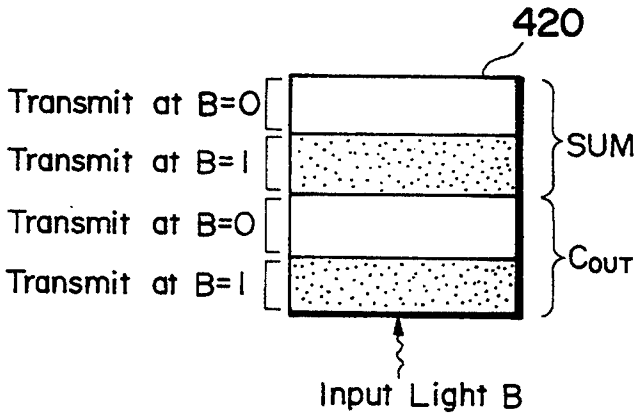
Figure 16:
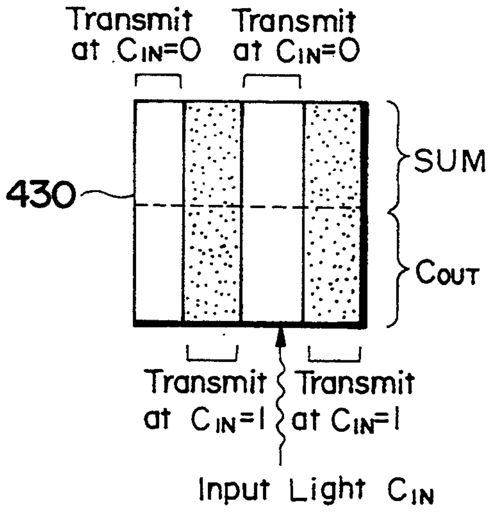
Figure 17:
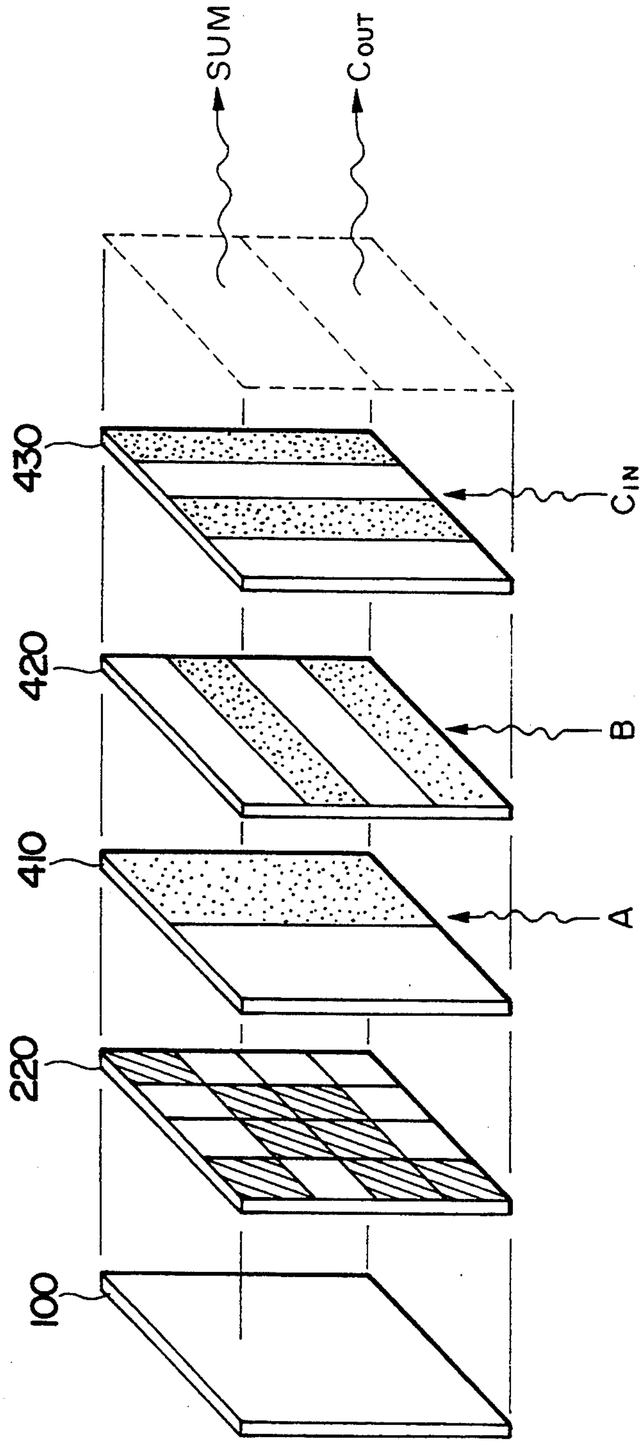
FIG. 17 shows major parts of the optical digital apparatus of the second embodiment.

The present apparatus comprises a plane light source 100, an operation result generation mask 220 (see FIGS. 12 and 13)for receiving the collimated light emitted from the plane light source 100 and outputting an aggregation of optical signals reflecting two of eight ($=2^3$) operation results which is equal to the number of all combinations of the three input lights, and a set of selectors 400 for receiving the input light A, the input light B and the input light $C_{IN}$ of the $8\times2$ operation results in the aggregation of the optical signals and selecting one of the four operation results in the aggregation of the optical signals in accordance with the combination of the input values. The plane light source 100 is constructed in the same manner as that of the first embodiment. The set of selectors 400 comprises a selector 410 (see FIG. 14) for receiving the input light A and transmitting only $4\times2$ of the $8\times2$ operation results lights received through the operation result generation slit 220 in accordance with the value of the input light A (that is, the presence or absence of the input light A), a selector 420 (see FIG. 15) for receiving the input light B and transmitting only 2×2 of the 4×2 operation result lights received through the selector 410 in accordance with the value of the input light B (that is, the presence or absence of the input light B), and a selector 430 (see FIG. 16) for receiving the input light $C_{IN}$ and transmitting only 1×2 operation result lights of the 2×2 operation result lights received through the selector 420 in accordance with the value of the input light $C_{IN}$ (that is, the presence or absence of the input light $C_{IN}$). FIG. 17 shows an arrangement relation of the operation result generation slit 220, the selector 410, the selector 420 and the selector 430.

In the present apparatus, the aggregation of the optical signals reflecting the 8×2 operation results of the 1-bit full addition is previously generated by the plane light source 100 and the operation result generation slit 220 and it is irradiated to the set of selectors 400. Under this condition, the input light A is applied to the selector 410, the input light B is applied to the selector 420 and the input light $C_{IN}$ is applied to the selector 430, and the light transmission areas of the selectors are determined in accordance with the values of the input lights to produce the output light SUM and the output light $C_{OUT}$.

In the present apparatus, the aggregation of the optical signals reflecting the operation results is generated by using the plane light source 100 and the operation result generation slit 220. Alternatively, the light beams reflecting the operation results may be generated by using an LED array or a laser diode array having two-dimensionally arranged LED's or laser diodes which are independently activated, as it is in the first embodiment. Further, the operation results of the 3-input 2-output type other than the NAND operation may be attained by merely modifying the pattern of the operation result generation mask as it is in the first embodiment.

<Third Embodiment>

Figure 18:
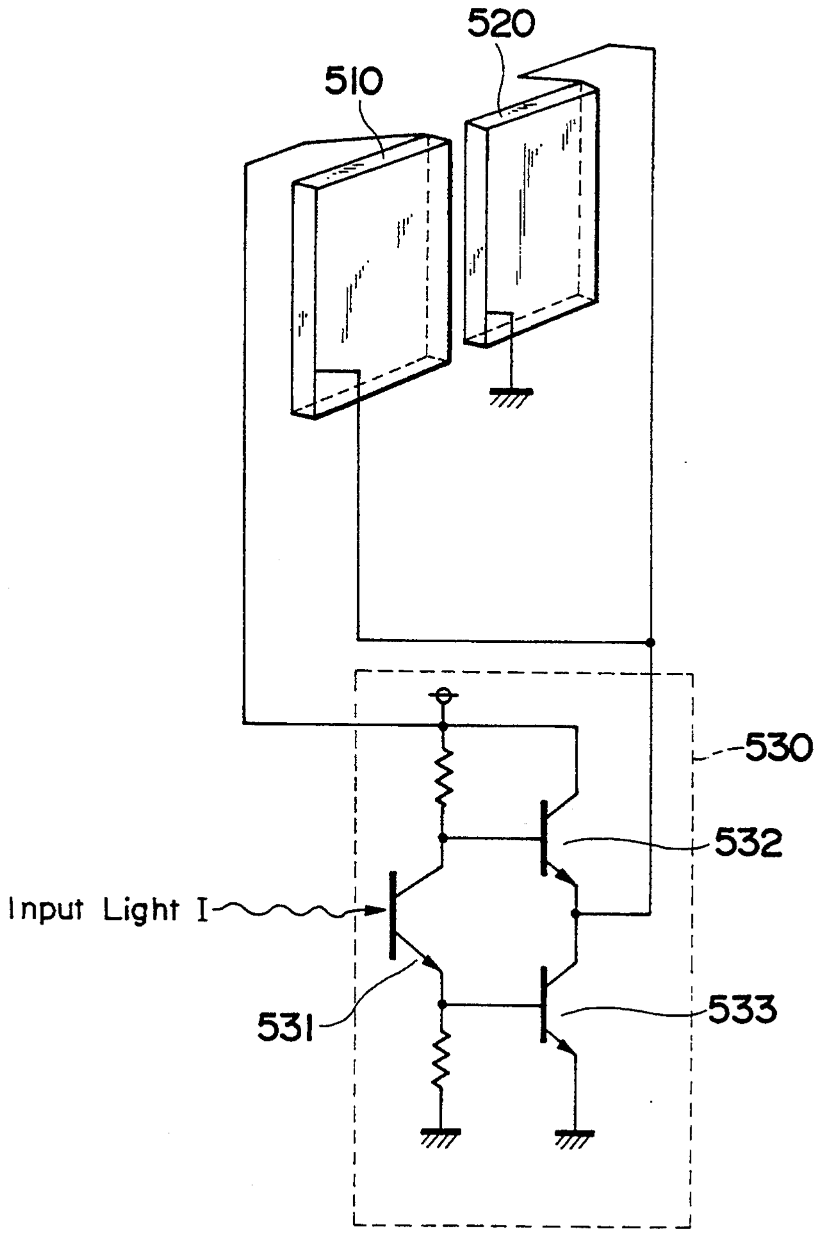
FIG. 18 shows a configuration of an optical digital apparatus in a third embodiment of the present invention.

In the present embodiment, an optical digital apparatus for selectively outputting lights received in a specified area which is required to execute a digital optical operation as that of the first embodiment or the second embodiment is provided. FIG. 18 shows a configuration of the apparatus. The present apparatus comprises variable transmission devices 510 and 520 having a quantum confined Stark effect or a Wannier-Stark localization effect, and a transmission control circuit 530 electrically connected to those devices as shown in FIG. 18. The transmission control circuit 530 comprises a photo-transistor 531 for receiving an input light I, transistors 532 and 533, and resistors connected as shown in FIG. 18.

When the input light I is not applied, the transistor 532 is conductive and the transistor 533 is non-conductive and a voltage is applied to only the variable transmission device 520, which does not substantially transmit the light because an electric field is established therein. Since no electric field is established in the variable transmission device 510, it transmits the light at a substantially full transmission. When the input light I is applied, the transistor 532 is non-conductive and the transistor 533 is conductive so that the voltage is applied to only the variable transmission device 510 which does not substantially transmit the light because an electric field is established therein. Since no electric field is established in the variable transmission device 520, substantially all lights are transmitted therethrough. In this manner, the optical digital apparatus which can be cascade-connected and selectively outputs the light received in the specified area is constructed. In switching the light receiving area of the light to be transmitted, the transistor 532 is provided for the variable transmission device 510 and the transistor 533 is provided for the variable transmission device 520 for discharging the electric charges accumulated in the device to which the voltage has been applied before switching. Accordingly, high speed switching of the transmission is attained. While the variable transmission device is used in the present embodiment, a variable reflection factor device may be used.

<Fourth Embodiment>

Figure 19:
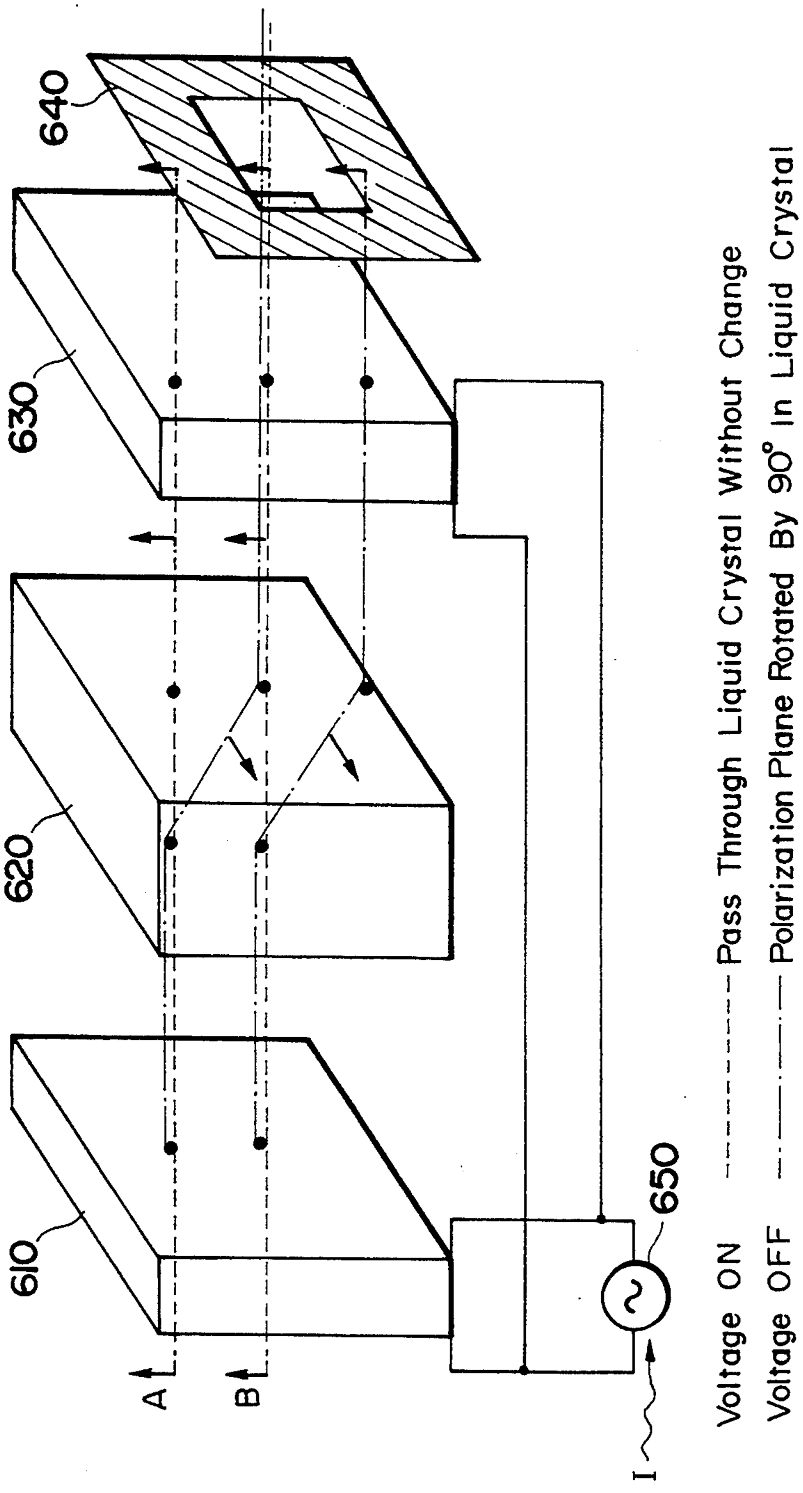
FIG. 19 shows a configuration of an optical digital apparatus in a fourth embodiment of the present invention.

In the present embodiment, an optical digital apparatus for selectively outputting lights received in a specified area which is required to execute a digital optical operation like that of the first embodiment or the second embodiment is provided. FIG. 19 shows a configuration of the present apparatus. It comprises a first polarization plane rotation device 610 made of 90 degrees TN liquid crystal, a double refraction device 620 made of calcite for receiving the light outputted from the first polarization plane rotation device, a second polarization plane rotation device 630 made of 90 degrees TN liquid crystal for receiving the light outputted from the double refraction device 620, a light selection slit 640 for transmitting a portion of the light outputted from the second polarization plane rotation device 630, and a deflection controller 650 controlling the first and second polarization plane rotation devices 610 and 630 to a non-rotation mode or a 90 degrees rotation mode of the direction of polarization to the input light. The deflection controller is in an ON state when the input light I is not applied, and in an OFF state when the input light I is applied to rotate the polarization plane by 90 degrees.

In the present apparatus, it is assumed that linearly polarized lights A and B are applied. When the deflection controller 650 does not receive the input light I, the deflection controller 650 is in the ON state so that the first and second polarization plane rotation devices 610 and 630 are in the non-rotation mode of the polarization plane. In this case, the input linearly polarized light A and B are applied to the double refraction device 620 without the change in the polarization plane so that an ordinary light is applied to the double refraction device 620 and it goes straight and passes through the double refraction device 620. As a result, only the light B of the lights transmitted through the second polarization plane rotation device passes through the light selection slit and it is outputted as shown.

When the deflection controller 650 receives the input light I, the deflection controller 650 is in the OFF state and the first and second polarization plane rotation devices 610 and 630 are in the 90 degrees rotation mode of the polarization plane. In this case, since the input linearly polarized lights A and B are applied to the double refraction device 620 with the polarization plane changed, they are extraordinary rays to the double refraction device 620 and they pass through the double refraction device with the modified optical path. As a result, only the light A of the lights transmitted through the second polarization plane rotation device and having the polarization direction thereof returned to the original direction passes through the light selection slit and it is outputted as shown.

The present invention is not limited to the above embodiments but various modifications thereof may be made. For example, in an optical digital apparatus for executing the digital optical operation, almost all operations can be executed by modifying the pattern of the operation result-generation mask, the number of selectors and the selection pattern.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

What is claimed is:

1. An optical digital apparatus comprising:

light emission means for outputting an aggregation of spatially distributed optical digital information signals propagating in a predetermined direction and bearing binary digital information; and a selector for receiving an optical control signal bearing binary digital information and selecting one of i) a portion of the aggregation of digital information signals received in a first area, and ii) a portion of the aggregation of digital information signals received in a second area in accordance with a value of the digital information borne by the optical control signal, said selector being one of i) a unit selector for outputting a selector optical information signal bearing the binary digital information borne by one of a first optical information signal received in said first area and a second optical information signal received in said second area in accordance with the value of the binary digital information borne by the optical control signal, and ii) a selector set comprising a combination of such unit selectors, each said unit selector including:

a first variable transmission device and a second variable transmission device driven independently for controlling the transmission of an input light;

first electric charge injecting means for injecting electric charge into said first variable transmission device;

first electric charge discharging means for discharging electric charge from said first variable transmission device;

second electric charge injecting means for injecting electric charge into said second variable transmission device;

second electric charge discharging means for discharging electric charge from said second variable transmission device; and an optical detection circuit for issuing an activation direction to one of the pairs comprising i) said first electric charge injecting means and said second electric charge discharging means, and ii) said second electric charge injecting means and said first electric charge discharging means, and issuing a deactivation direction to the other of said pairs in accordance with the value the binary digital information borne by the input optical control signal.

2. An optical digital apparatus according to claim 1 wherein said variable transmission device is a self-electro-optic effect device and has one of a quantum confined Stark effect and a Wannier-Stark localization effect.

3. An optical digital apparatus according to claim 1 further comprising, in a succeeding stage of said selector, another selector for receiving other optical control signals bearing binary digital information and selectively outputting one of a portion of an aggregation of the digital information signals received in another predetermined area and a portion of an aggregation of the digital information signals received in an area other than said another area in accordance with a value of the digital information borne by the other optical control signals.

4. An optical digital apparatus according to claim 3 wherein said variable transmission device is a self-electro-optic effect device and has one of a quantum confined Stark effect and a Wannier-Stark localization effect.

5. An optical digital apparatus according to claim 3 wherein said light emission means is operation result generation means for generating an aggregation of optical information signals of the number equal to the number of all combinations of a first number of binary digital values having substantially parallel propagation directions to each other reflecting a result of a predetermined operation for all combination of the first number of binary digital values, and a sum of the number of said selectors and the number of said other selectors is equal to the first number.

6. An optical digital apparatus according to claim 5 wherein said first number is 3 and wherein a second number of said binary digital values is 2, and said predetermined operation includes 1-bit full addition.

7. An optical digital apparatus according to claim 5 wherein said first number is 2 and wherein a second number of said binary digital values is 1, and said predetermined operation is one of a 2-input AND, 2-input OR, 2-input XOR, and 2-input XNOR operation.

8. An optical digital apparatus according to claim 5 wherein said operation result generation means comprises independently actuatable light emitters of the number equal to the number of all combinations of the first number of binary digital information for outputting parallel beams to each other.

9. An optical digital apparatus according to claim 8 wherein said light emitter includes one of a laser oscillator and a photo-diode.

10. An optical digital apparatus according to claim 5 wherein said operation result generation means comprises:

a light emitting device;

first optical means for spatially spreading the light outputted from said light emitting device;

second optical means for collimating the light outputted from said first optical means; and a selection mask plate for receiving the collimated beam outputted from said second optical means to select one of the light transmission and the non-transmission in accordance with the value of the operation result in the area corresponding to the operation result of the operation results of all combination of the first number of binary digital information.

11. An optical digital apparatus according to claim 10 wherein said light emitting device is one of a laser oscillator and a photo-diode.

12. An optical digital apparatus according to claim 10 wherein said first optical means is one of a convex lens and a concave mirror.

13. An optical digital apparatus according to claim 10 wherein said second optical means is one of a convex lens and a concave mirror.

14. An optical digital apparatus according to claim 1 further comprising, in a succeeding stage of said selector, another selector for receiving other optical control signals bearing binary digital information and selectively outputting one of a portion of an aggregation of the digital information signals received in another predetermined area and a portion of an aggregation of the digital information signals received in an area other than said another predetermined area in accordance with a value of the digital information borne by the other optical control signals, said another selector including a unit selector comprising:

a first variable reflection factor device and a second variable reflection factor device driven independently for controlling the reflection of an input light;

means for injecting electric charge into said first variable reflection factor device;

means for discharging electric charge from said first variable reflection factor device;

means for injecting electric charge into said second variable reflection factor device;

means for discharging electric charge from said second variable reflection factor device; and an optical detection circuit for issuing an activation direction to one of the pairs comprising i) said means for injecting electric charge into said first variable reflection factor device and said means for discharging electric charge from said second variable reflection factor device, and ii) said means for injecting electric charge into said second variable reflection factor device and said means for discharging electric charge from said first variable reflection factor device, and issuing a deactivation direction to the other of said pairs in accordance with a value of the binary digital information borne by the input optical control signal.

15. An optical digital apparatus according to claim 14 wherein said variable reflection factor device is a self-electro-optic effect device and has one of a quantum confined Stark effect and a Wannier-Stark localization effect.

16. An optical digital apparatus according to claim 14 wherein said light emission means comprises operation result generation means for generating an aggregation of a second number of optical information signals of a number equal to the number of all combinations of a first number of binary digital values having substantially parallel propagation directions to each other representing predetermined operation for all combinations of the first number of binary digital values, and a sum of the number of said selectors and the number of said other selectors being equal to the first number.

17. An optical digital apparatus according to claim 16 wherein said operation result generation means comprises:

a light emitting device;

first optical means for spatially spreading the light output from said light emitting device;

second optical means for collimating the light output from said first optical means; and a selection mask plate for receiving the collimated beam output from said second optical means to control light transmission in accordance with the value of an operation result.

18. An optical digital apparatus according to claim 17 wherein said light emitting device is one of a laser oscillator and a photo-diode.

19. An optical digital apparatus according to claim 17 wherein said first optical means is one of a convex lens and a concave mirror, and said second optical means is one of a convex lens and a concave mirror.

20. An optical digital apparatus according to claim 16 wherein said first number is 2 and said second number is 1, and said predetermined operation is one of 2-input AND, 2-input OR, 2-input XOR, and 2-input XNOR.

21. An optical digital apparatus according to claim 16 wherein said first number is 3 and said second number is 2, and said predetermined operation includes 1-bit full addition.

22. An optical digital apparatus according to claim 16 wherein said operation result generation means comprises independently actuatable light emitters of a number equal to the number of all combinations of the first number of binary digital information for outputting parallel beams to each other.

23. An optical digital apparatus according to claim 22 wherein said light emitter includes one of a laser oscillator and a photo-diode.

24. An optical digital apparatus according to claim 1, wherein said light emission means is operation result generation means for generating each of an optical information signal bearing "1" binary digital information and an optical information signal bearing "0" binary digital information, and said selector includes a unit selector.

25. An optical digital apparatus according to claim 24 wherein said operation result generation means comprises:

a light emitting device;

first optical means for spatially spreading the light outputted from said light emitting device;

second optical means for collimating the light outputted from said first optical means; and a selection mask plate for receiving the collimated beam outputted from said second optical means to select one of the light transmission and the non-transmission in accordance with the value of the operation result in the area corresponding to the operation result of the operation results of all combination of the first number of binary digital information.

26. An optical digital apparatus according to claim 25 wherein said light emitting device is one of a laser oscillator and a photo-diode.

27. An optical digital apparatus according to claim 25 wherein said first optical means is one of a convex lens and a concave mirror.

28. An optical digital apparatus according to claim 25 wherein said second optical means is one of a convex lens and a concave mirror.

29. An optical digital apparatus according to claim 24 wherein said operation result generation means comprises independently actuatable light emitters of the number equal to the number of all combinations of the first number of binary digital information for outputting parallel beams to each other.

30. An optical digital apparatus according to claim 29 wherein said light emitter include one of a laser oscillator and a photo-diode.

31. An optical digital apparatus according to claim 24 wherein said apparatus executes an inversion operation.

32. An optical digital apparatus according to claim 1, wherein said first and second electric charge injecting means and said first and second electric charge discharging means together comprise an arrangement of three transistors.

33. An optical digital apparatus comprising:

light emission means for outputting an aggregation of spatially distributed optical digital information signals propagating in a predetermined direction and bearing binary digital information; and a selector for receiving an optical control signal bearing binary digital information and selecting one of i) a portion of the aggregation of digital information signals received in a first area, and ii) a portion of the aggregation of digital information signals received in a second area in accordance with a value of the digital information borne by the optical control signal, said selector being one of i) a unit selector for outputting a selector optical information signal bearing the binary digital information borne by one of a first optical information signal received in said first area and a second optical information signal received in said second area in accordance with the value of the binary digital information borne by the optical control signal and ii) a selector set comprising a combination of such unit selectors, each said unit selector including:

a first variable reflection factor device and a second variable reflection device driven independently for controlling the reflection of an input light;

first electric charge injecting means for injecting electric charge into said first variable reflection device;

first electric charge discharging means for discharging electric charge from said first variable reflection device;

second electric charge injecting means for injecting electric charge into said second variable reflection device;

second electric charge discharging means for discharging electric charge from said second variable reflection device; and an optical direction circuit for issuing an activation direction to one of the pairs comprising i) said first electric charge injecting means and said second electric charge discharging means, and ii) said second electric charge injecting means and said first electric charge discharging means, and issuing a deactivation direction to the other of said pairs in accordance with a value of the binary digital information borne by the input optical control signal.

34. An optical digital apparatus according to claim 33 wherein said variable reflection factor device is a self-electro-optic effect device and has one of a quantum confined Stark effect and a Wannier-Stark localization effect.

35. An optical digital apparatus according to claim 33 wherein said light emission means comprises operation result generation means for generating each of an optical information signal bearing "1" binary digital information and an optical information signal bearing "0" binary digital information.

36. An optical digital apparatus according to claim 35 wherein said operation result generation means comprises:

a light emitting device;

first optical means for spatially spreading the light output from said light emitting device;

second optical means for collimating the light output from said first optical means; and a selection mask plate for receiving the collimated beam output from said second optical means to control light transmission accordance with the value of an operation result.

37. An optical digital apparatus according to claim 36 wherein said light emitting device is one of a laser oscillator and a photo-diode.

38. An optical digital apparatus according to claim 36 wherein said first optical means is one of a convex lens and concave mirror.

39. An optical digital apparatus according to claim 36 wherein said second optical means is one of a convex lens and a concave mirror.

40. An optical digital apparatus according to claim 35 wherein said operation result generation means comprises independently actuatable light emitters of a number equal to the number of all combinations of a first number of binary digital information for outputting parallel beams to each other.

41. An optical digital apparatus according to claim 40 wherein said light emitter includes one of a laser oscillator and a photo-diode.

42. An optical digital apparatus according to claim 35 wherein said apparatus executes an inversion operation.

* * * * *